United States Patent
Andersson et al.

(10) Patent No.: US 10,841,601 B2
(45) Date of Patent: Nov. 17, 2020

(54) METHODS AND ARRANGEMENTS FOR TRANSCODING

(71) Applicant: Telefonaktiebolaget LM Ericsson (publ), Stockholm (SE)

(72) Inventors: Kenneth Andersson, Gävle (SE); Thomas Rusert, Kista (SE); Per Wennersten, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 287 days.

(21) Appl. No.: 15/735,705

(22) PCT Filed: Jun. 23, 2015

(86) PCT No.: PCT/SE2015/050727
§ 371 (c)(1),
(2) Date: Dec. 12, 2017

(87) PCT Pub. No.: WO2016/209125
PCT Pub. Date: Dec. 29, 2016

(65) Prior Publication Data
US 2020/0036990 A1    Jan. 30, 2020

(51) Int. Cl.
*H04N 19/40* (2014.01)
*H04N 19/48* (2014.01)
*H04N 19/61* (2014.01)

(52) U.S. Cl.
CPC .......... *H04N 19/40* (2014.11); *H04N 19/48* (2014.11); *H04N 19/61* (2014.11)

(58) Field of Classification Search
None
See application file for complete search history.

(56) References Cited

U.S. PATENT DOCUMENTS

| | | | |
|---|---|---|---|
| 6,404,814 B1 * | 6/2002 | Apostolopoulos | H04N 19/20 375/240.08 |
| 6,647,061 B1 * | 11/2003 | Panusopone | H04N 21/234309 375/240.12 |
| 2001/0050924 A1 * | 12/2001 | Herrmann | H04N 21/235 370/493 |

(Continued)

FOREIGN PATENT DOCUMENTS

| | | |
|---|---|---|
| WO | 2013188457 A2 | 12/2013 |
| WO | 2015053673 A1 | 4/2015 |
| WO | 2015053697 A1 | 4/2015 |

OTHER PUBLICATIONS

IP.Com search report.*

(Continued)

*Primary Examiner* — Mohammad J Rahman
(74) *Attorney, Agent, or Firm* — Rothwell, Figg, Ernst & Manbeck, P.C.

(57) ABSTRACT

According to one aspect the present invention relates to a method for a video encoder. The method comprises providing (601) to a transcoder a first bitstream representing a video sequence with a first format, creating (602) a second bitstream representing transcoding information indicative of a transcoding method that should be used by the transcoder for transcoding the video sequence from the first format to a second format, and providing (603) to the transcoder the second bitstream.

21 Claims, 11 Drawing Sheets

(56) References Cited

U.S. PATENT DOCUMENTS

| | | | |
|---|---|---|---|
| 2003/0227974 A1* | 12/2003 | Nakamura | H04N 19/48 375/240.25 |
| 2005/0226324 A1* | 10/2005 | Ouyang | H04N 21/440218 375/240.12 |
| 2005/0265445 A1* | 12/2005 | Xin | H04N 19/61 375/240.2 |
| 2006/0165180 A1* | 7/2006 | Koyama | H04N 19/176 375/240.23 |
| 2008/0049836 A1* | 2/2008 | Purcell | H04N 19/61 375/240.12 |
| 2008/0219356 A1* | 9/2008 | Johar | H04N 19/40 375/240.24 |
| 2008/0247465 A1* | 10/2008 | Xin | H04N 19/56 375/240.16 |
| 2009/0003432 A1* | 1/2009 | Liu | H04N 21/23406 375/240.01 |
| 2009/0060032 A1* | 3/2009 | Schmit | H04N 19/61 375/240.01 |
| 2009/0168884 A1* | 7/2009 | Lu | H04N 19/56 375/240.16 |
| 2009/0175334 A1* | 7/2009 | Ye | H04N 19/12 375/240.12 |
| 2009/0222872 A1* | 9/2009 | Schlack | H04N 7/173 725/114 |
| 2010/0260262 A1* | 10/2010 | Coban | H04N 19/139 375/240.13 |
| 2010/0296572 A1* | 11/2010 | Ramaswamy | H04N 21/2221 375/240.01 |
| 2011/0013692 A1* | 1/2011 | Cohen | H04N 19/139 375/240.02 |
| 2011/0135286 A1* | 6/2011 | Moon | G11B 27/28 386/330 |
| 2013/0301699 A1* | 11/2013 | Pearson | H04N 19/15 375/240.02 |
| 2014/0003515 A1* | 1/2014 | Ohgose | H04N 19/103 375/240.12 |
| 2014/0010297 A1* | 1/2014 | Ohgose | H04N 19/176 375/240.12 |
| 2014/0240591 A1* | 8/2014 | Rajagopalan | H04N 19/463 348/441 |
| 2014/0269927 A1* | 9/2014 | Naletov | H04N 19/157 375/240.18 |
| 2016/0345027 A1* | 11/2016 | Winger | H04N 19/115 |

OTHER PUBLICATIONS

International Search Report and Written Opinion issued in International Application No. PCT/SE2015/050727, dated Jun. 23, 2015, 15 pages.

Shen, B. "Submacroblock Motion Compensation for Fast Down-Scale Transcoding of compressed Video", Senior Member IEEE, IEEE Transactions on Circuits and Systems for Video Technology, vol. 15, No. 10, Oct. 2005, pp. 1291-1302.

* cited by examiner

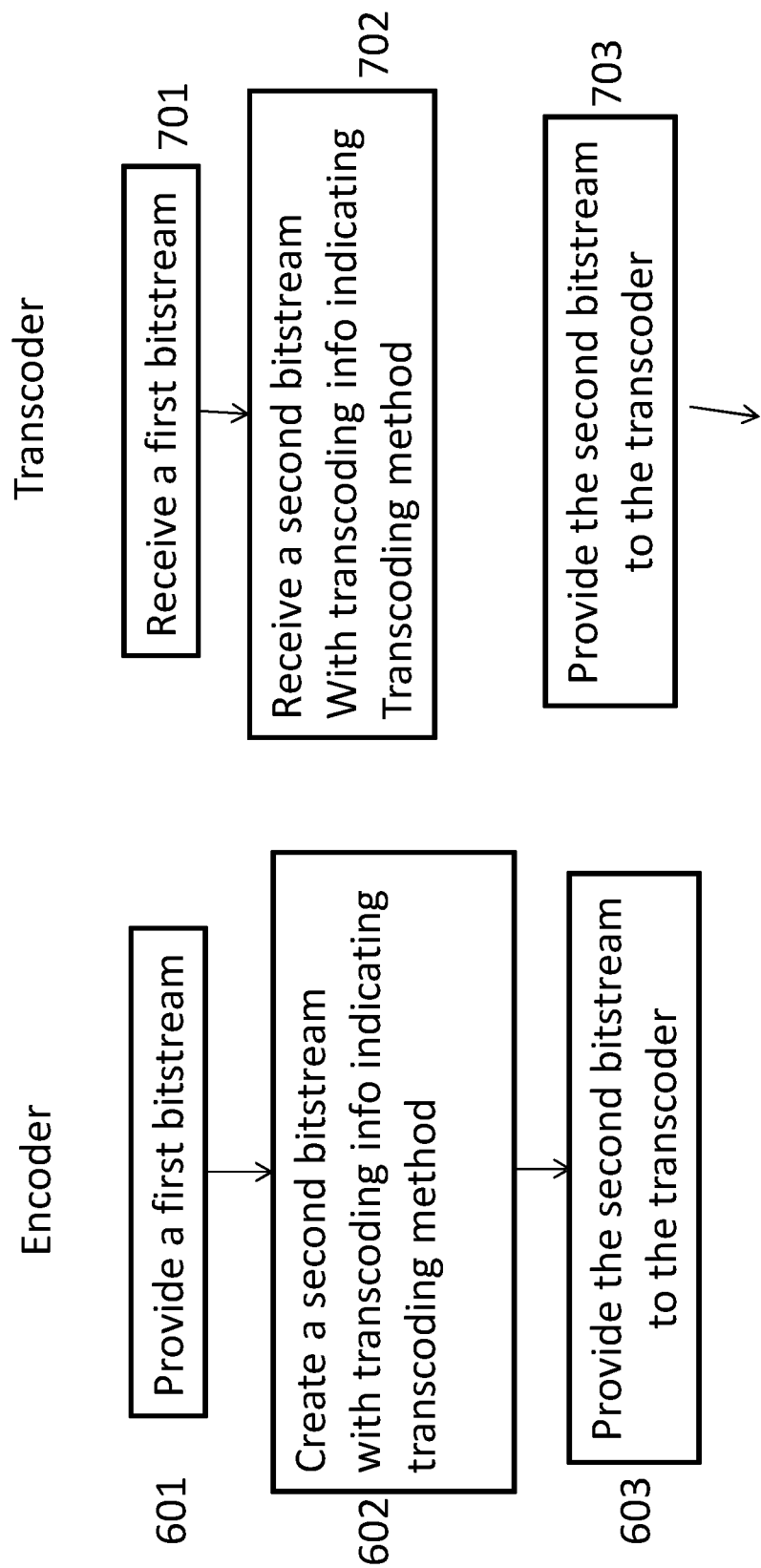

METHODS AND ARRANGEMENTS FOR TRANSCODING

CROSS REFERENCE TO RELATED APPLICATION(S)

This application is a 35 U.S.C. § 371 National Stage of International Patent Application No. PCT/SE2015/050727, filed Jun. 23, 2015, designating the United States, the disclosure of which is incorporated by reference.

TECHNICAL FIELD

The embodiments described herein relate to methods and arrangements for transcoding, and in particular mechanisms for improving transcoding.

BACKGROUND

Video transcoding is a technique to transcode one video coding format to another video format.

As illustrated in FIG. 1, an origin encoder 110 encodes a video sequence 100 to a first bitstream with a first format 120 and sends the first bitstream to a transcoder 130. A format comprises video picture resolution, bitrate and/or information of a video coding standard the format corresponds to. The transcoder 130 transcodes the first bitstream 120 to a second format 140, wherein the second format is adapted for an end-device 150. E.g. for a user device with a small display a low resolution (i.e. video picture resolution) is enough while a user device with a bigger display requires a higher resolution and thereby another format.

Transcoding may imply that a transcoder receives a coded bitstream with a first bitrate and a first video picture resolution and the transcoder transcodes the coded bitstream to a second bitstream with a second bitrate and a second video picture resolution (which may or may not be different from the first video picture resolution). The coded bitstream received by the transcoder is hereafter referred to as the first bitstream and is encoded by an origin encoder. Hence the first bitstream is decoded by the transcoder and downsampled to the second resolution (if the second resolution is lower than the first resolution), and re-encoded at the second bit rate and the second resolution. This is traditional or regular transcoding which is in this specification denoted as "full transcoding". One drawback with full transcoding is that it is very computationally demanding for the transcoder since, parameters e.g. related to transform size, coefficients, intra prediction and motion need to be optimized in rate distortion sense, i.e. the re-encoding step in the transcoder is computationally demanding. The full transcoding is illustrated in FIG. 2.

FIG. 2 illustrates schematically an origin encoder 200 and a transcoder 210 located in a network node. The origin encoder 200 encodes an original video O, sends the encoded bitstream A to the transcoder 210 and the transcoder 210 transcodes, i.e. decodes the encoded bitstream and generates an encoded bitstream with a second format B which is sent to an end-point, e.g. a user device.

An alternative to full transcoding is simulcast. In simulcast, both a bitstream with a first format and a bitstream with a second format are generated from an original video at the origin encoder, and transmitted over the network. This results in more network traffic, but the transcoding node does not need to perform any computations. In the case of simulcast, the transcoder only need to select the format that best corresponds to the channel capacity/end-device capabilities etc, which implies that the transcoder forwards one of the bitstream with the selected format. FIG. 3 illustrates simulcast where an origin encoder encodes an original video to generate a first encoded bitstream with a first format and a second encoded bitstream with a second format, and sends both bitstreams to a receiver.

A coded video bitstream for today's video coding standards such as H.264 or HEVC can be said to essentially comprise of two types of data, (1) data that indicates inter-picture or intra-picture prediction modes as well as related motion vectors, (2) transform coefficients indicating residual information to be added to the inter/intra prediction signals during decoding. In video encoding/re-encoding, the most computationally demanding part is to obtain the data. Once that is available, obtaining the transform coefficients imposes comparably low computational complexity demands.

Guided transcoding as described in WO 2015/053673 A1 can be used to reduce the computational complexity of the transcoding operation by applying side information in the re-encoding process that reduces the need for complex evaluations in the re-encoder. The side information is generated together with the first bitstream in the origin encoder and sent to the transcoder. Generating the side information may be computationally complex as well, but the drawback of computational complexity for generation of side information may be much lower than the drawback of computational complexity during transcoding, e.g. in scenarios where the side information is generated only once (at an origin node) and then applied at many transcoders (at several edge nodes). In WO 2015/053697 the side information bitstream contains residual that is added to the residual that is generated at the guided transcoding to improve the performance.

FIG. 4 illustrates schematically guided transcoding. An origin encoder 400 encodes an original video into a first bitstream with a first format A, and generates side information B to be used by the transcoder 410 when transcoding the first bitstream to the second format. Hence the side information comprises information how to convert the first bitstream from the first format to the second format, which results in that the transcoder is able to generate the second bitstream from the first bitstream much faster with less complexity thanks to the additional side information.

Compared to regular transcoding also referred to as full transcoding, guided transcoding provides less complex transcoding at the cost of sending side information. Compared to simulcast, it reduces the information sent in the network, but requires simple transcoding at the transcoder in the network, and reduces the compression efficiency because already compressed bitstreams are used to generate other compressed bitstreams. In a typical implementation of guided transcoding, the parameters e.g. related to transform size, coefficients, intra prediction and motion are transmitted as side information.

SUMMARY

One problem with transcoding and guided transcoding is that they both have a coding efficiency cost compared to directly encoding to the second bitrate and second resolution without transcoding from a first resolution, the reason being that the re-encoding is performed based on already compressed video. Comparing guided transcoding and full transcoding, guided transcoding imposes less transcoding complexity, but it requires transmission of additional side information, thus it is less bandwidth efficient.

That is, comparing full transcoding, guided transcoding, and simulcast to the end-device (where the second bitstream is needed), there is a trade-off between origin-to-end device transmission bandwidth requirement, transcoding complexity, and coding efficiency of the second bitstream.

One idea with the embodiments is to enable switching between different methods of transcoding, such as full transcoding, guided transcoding, and simulcast. Thus the embodiments provides mechanisms to enable such switching by indicating in the second bitstream which transcoding method to be used by the transcoder, and mechanisms to apply different methods based on transcoding information indicative of the transcoding method to be used at the transcoder.

A particular problem solved according to some embodiments is to provide transcoding information while retaining an existing video codec bitstream format; that allows re-using existing video encoder and decoder implementations to a large extent. This is about having the transcoder to derive the transcoding information from one or several syntax elements of a bitstream. An existing open-source decoder can be used in the transcoder to decode the transcoding information, only adding some mechanism to decide what the transcoder should do based on the values of the syntax element(s). An open-source encoder can then be re-used in the transcoder to a large extent to encode to a transcoded bitstream based on the decoded coding parameters from the decoded transcoding information.

By using some embodiments, it is e.g. possible to deploy normal encoding (implying simulcast) for some blocks, slices or the entire picture and guided transcoding for other. Normal encoding corresponds to having the true coded residual included in the bitstream sent to the transcoder and guided transcoding corresponds to re-generating coded residual at the transcoder. The transcoder determines if it needs to re-generate a coded residual or can use the coded residual based on transcoding information, also referred to as transcoding indicator. The transcoding information can either be explicitly signaled if the corresponding cbf (coded block flag) is non-zero (coded residual exist) or be derived implicitly from the coded residual.

According to one aspect a method for a video encoder is provided. In the method, a first bitstream representing a video sequence with a first format is provided to a transcoder, a second bitstream is created wherein the second bitstream is representing transcoding information indicative of a transcoding method that should be used by the transcoder for transcoding the video sequence from the first format to a second format. The second bitstream is provided to the transcoder.

According to one aspect a method for a video transcoder is provided. In the method, a first bitstream representing a video sequence with a first format is received from an encoder, a second bitstream is received wherein the second bitstream represents transcoding information indicative of a transcoding method that should be used by the transcoder for transcoding the video sequence from the first format to a second format, and the first bitstream is transcoded from the first format to the second format using the indicated transcoding method.

According to one aspect a method for a video processing node is provided. In the method a second bitstream representing a video sequence with a second format is received from an encoder, transcoding information indicative of a transcoding method that should be used by a transcoder for transcoding a video sequence from a first format to the second format is inserted in the second bitstream, and the second bitstream comprising the inserted transcoding information indicative of a transcoding method that should be used by the transcoder for transcoding a video sequence from the first format to the second format is transmitted to the transcoder.

According to one aspect a video encoder is provided. The video encoder is configured to provide to a transcoder a first bitstream representing a video sequence with a first format further configured to create a second bitstream representing transcoding information indicative of a transcoding method that should be used by the transcoder for transcoding the video sequence from the first format to a second format, and further configured to provide to the transcoder the second bitstream.

According to one aspect a method for a video transcoder is provided. The video transcoder is configured to receive from an encoder a first bitstream representing a video sequence with a first format and configured to receive a second bitstream representing transcoding information indicative of a transcoding method that should be used by the transcoder for transcoding the video sequence from the first format to a second format and configured to transcode the first bitstream from the first format to the second format using the indicated transcoding method.

According to one aspect a video processing node is provided. The video processing node is configured to receive from an encoder a second bitstream representing a video sequence with a second format, configured to insert, in the second bitstream, transcoding information indicative of a transcoding method that should be used by a transcoder for transcoding a video sequence from a first format to the second format, and configured to transmit the second bitstream comprising the inserted transcoding information indicative of a transcoding method that should be used by the transcoder for transcoding the video sequence from the first format to the second format.

According to one aspect a method for a video encoder is provided. The video encoder comprises a transmitter for providing to a transcoder a first bitstream representing a video sequence with a first format a bitstream creator for creating a second bitstream representing transcoding information indicative of a transcoding method that should be used by the transcoder for transcoding the video sequence from the first format to a second format, and the transmitter is further configured to provide to the transcoder the second bitstream.

According to one aspect a method for a video transcoder is provided. The video transcoder comprises a receiver for receiving from an encoder a first bitstream representing a video sequence with a first format and for receiving a second bitstream representing transcoding information indicative of a transcoding method that should be used by the transcoder for transcoding the video sequence from the first format to a second format.

According to one aspect a video processing node is provided. The video processing node comprises a receiver for receiving from an encoder a second bitstream representing a video sequence with a second format, an inserter for inserting, in the second bitstream, transcoding information indicative of a transcoding method that should be used by a transcoder for transcoding a video sequence from a first format to the second format, and a transmitter for transmitting the second bitstream comprising the inserted transcoding information indicative of a transcoding method that should be used by the transcoder for transcoding the video sequence from the first format to the second format.

According to one aspect a computer program is provided. The computer program comprises instructions, which when executed by a processor, cause said processor to provide to a transcoder a first bitstream representing a video sequence with a first format, to create a second bitstream representing transcoding information indicative of a transcoding method that should be used by the transcoder for transcoding the video sequence from the first format to a second format, to provide to the transcoder the second bitstream.

According to one aspect a computer program is provided. The computer program comprises instructions, which when executed by a processor, cause said processor to receive from an encoder a first bitstream representing a video sequence with a first format and to receive a second bitstream representing transcoding information indicative of a transcoding method that should be used by the transcoder for transcoding the video sequence from the first format to a second format.

According to one aspect a computer program is provided. The computer program comprises instructions, which when executed by a processor, cause said processor to receive from an encoder a second bitstream representing a video sequence with a second format, to insert, in the second bitstream, transcoding information indicative of a transcoding method that should be used by a transcoder for transcoding a video sequence from a first format to the second format, and to transmit the second bitstream comprising the inserted transcoding information indicative of a transcoding method that should be used by the transcoder for transcoding the video sequence from the first format to the second format.

The transcoding methods may be simulcast, full transcoding or/and guided transcoding.

A further advantage by some of the embodiments is that the coding efficiency cost of deploying normal transcoding or guided transcoding (i.e. bitrate overhead associated with the transcoded bitstream) can be reduced by selectively transmitting residual information to the transcoder e.g. on a per-block basis, instead of generating that residual information in the transcoder (or guided transcoder). The reason is that the transmitted residual data can take information about the original video into account, whereas residual information generated at the transcoder needs to be based on already compressed video.

A yet further advantage by some of the embodiments is that when the transcoding information is sent in a format that is compliant with a bitstream format of an existing codec (such as HEVC (High Efficiency Video Codec), it is easily possible to make reuse of existing encoders or decoders.

BRIEF DESCRIPTION OF THE DRAWINGS

FIG. 6-FIG. 8 are flowcharts of methods according to embodiments of the present invention.

DETAILED DESCRIPTION

Figure 1:
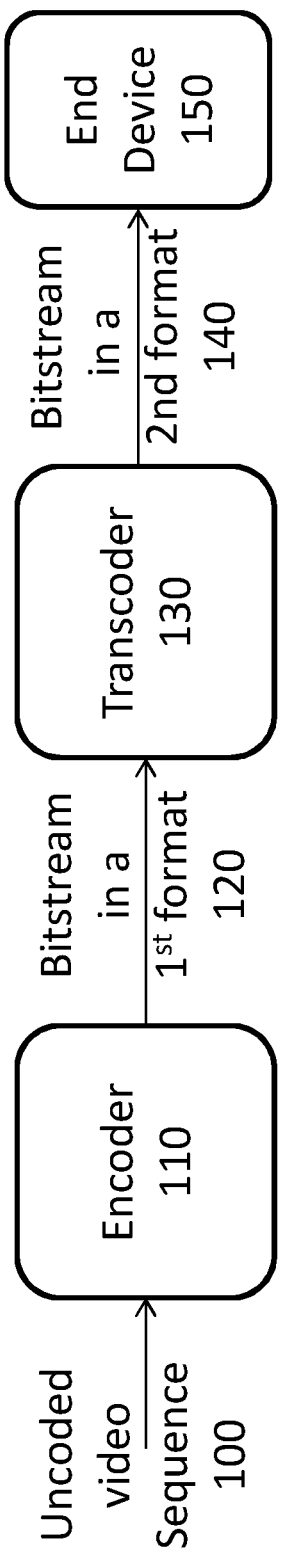
FIG. 1 illustrates schematically an operation of a transcoder according to prior art.
Figure 2:
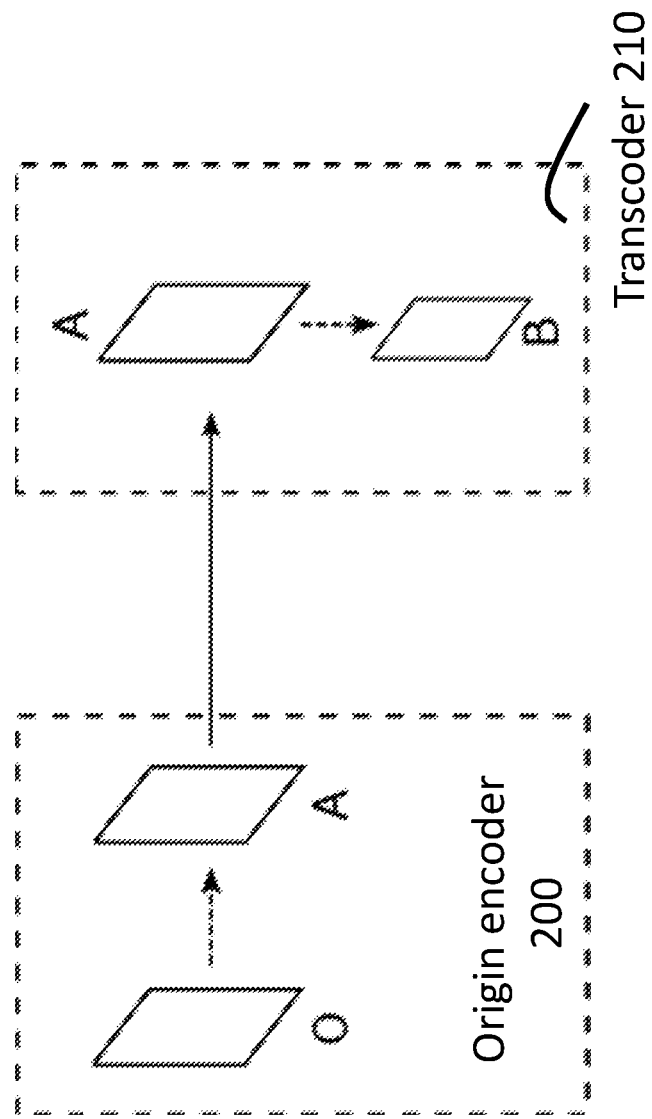
FIG. 2 illustrates schematically a full transcoding operation according to prior art
Figure 3:
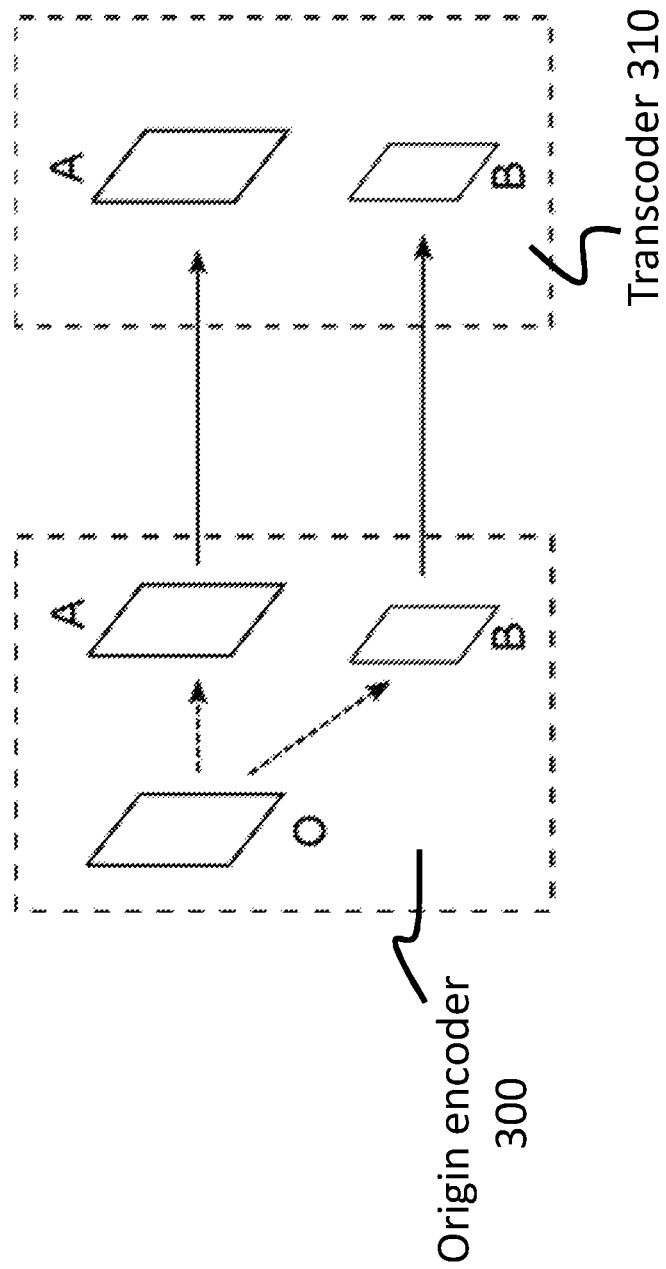
FIG. 3 illustrates schematically simulcast according to prior art.
Figure 4:
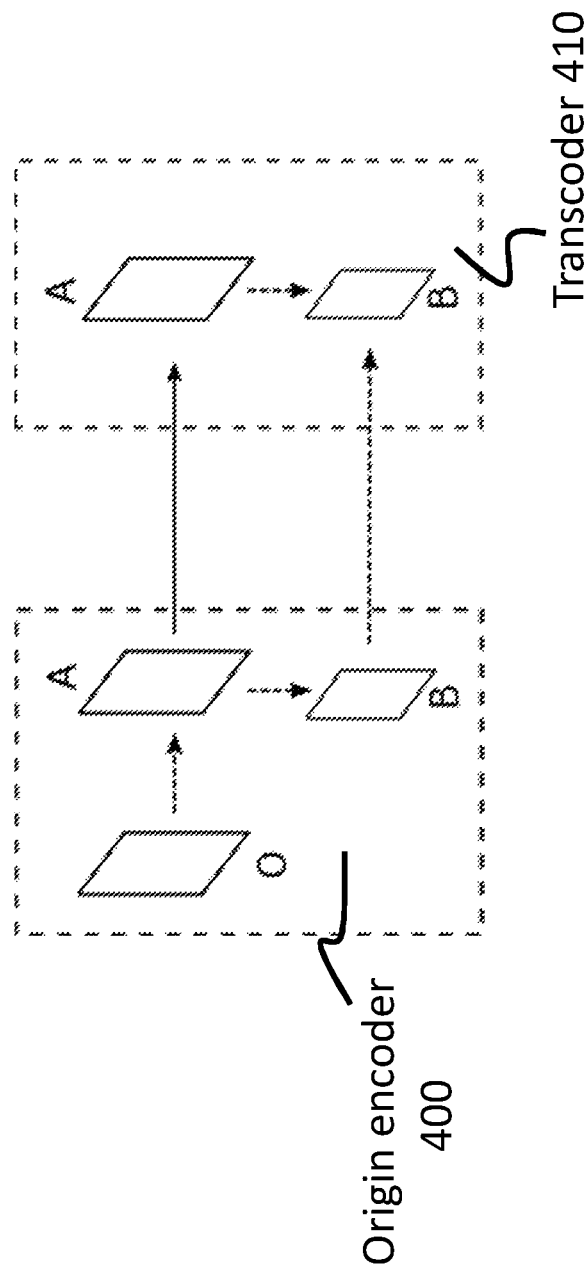
FIG. 4 illustrates schematically transcoding with side information according to prior art.

The embodiments involve an origin encoder and an transcoder. The origin encoder receives a first bitstream which is an input video and encodes it into a first format, e.g. a high quality compressed video representation (referred to as high quality (HQ) bitstream) which is sent to the transcoder. The transcoder transcodes the video of the first format into a second format, e.g. transcodes the high quality video into a lower quality compressed video representation (lower bitrate and possibly lower picture resolution), In addition to the first bitstream, a second bitstream also referred to as side information bitstream (SI bitstream) is sent from the origin encoder to the transcoder. The SI bitstream may contain information that can be used for guided transcoding according to WO 2015/053673 A1. Additionally and according to the embodiments of the present invention, the second bitstream contains information to indicate to the transcoder one of a set of different transcoding methods to be used, such as full transcoding, guided transcoding, or copying explicitly transmitted information from the second bitstream also referred to as simulcast.

To illustrate embodiments of the present invention the following example is provided. The origin encoder creates an HQ (high quality) bitstream (also referred to as the first bitstream) and a SI (side information) bitstream (also referred to as the second bitstream). According to the embodiments of the present invention, the SI bitstream contains information about the transcoding method to be used by the transcoder. One approach is to select the transcoding method to be used on a block-by-block basis, e.g. prediction unit basis or transform unit basis as in HEVC. One way of selecting the transcoding method is for each transcoding method, to consider the impact of the method decision in the SI bitstream bitrate as well as the bitrate and distortion after transcoding, i.e. combining those factors by means of e.g. a Lagrangian cost function, and selecting the method with the lowest cost. The cost for the complexity of the transcoding operation (which may be different for the different transcoding methods, may be taken into account in the cost function as well.

One example would be that three different transcoding methods can be selected which are:
  sending only the motion vector and having the residual generated at the transcoder by means of guided transcoding (method 1),
  sending both the motion vector and the residual data which will be copied into the transcoded bitstream by the transcoder, also referred to as simulcast (method 2), and
  not sending anything since the transcoder derives everything, e.g. full transcoding (method 3).

The origin encoder and the transcoder should preferably be in sync meaning that exactly the same reconstructed pixel values are generated and used for reference at both the encoder and the transcoder. That means that the residual data generated by the transcoder in guided transcoding (method 1) and full transcoding (method 3) should preferably be identical to the residual data generated at the origin encoder but not transmitted to the transcoder. Otherwise there will be a drift between the origin encoder and the transcoder producing a less coding efficient transcoded bitstream. One method to have the origin encoder and the transcoder in sync is to deploy same algorithms and settings for both the encoder and the transcoder, e.g. the same transforms etc, that are used to produce the residual data. In general the number of bits needed in the SI bitstream may be expected to be higher for method 2 than for method 1 and method 3, while the coding efficiency of the transcoded bitstream may be favorable when method 2 is used. Thus, to illustrate the approach, if the difference between bits needed in the SI bitstream for method 1 and method 2 is small while method 2 leads to much better coding efficiency of the transcoded bitstream, then method 2 (simulcast) should be selected. Conversely, if the number of bits needed in the SI bitstream for method 2 is much higher than for method 1, while the difference in coding efficiency of the transcoded bitstream is low for the two methods, then method 1 should be selected. If the number of bits is much higher for method 1 than for method 3, while the difference in coding efficiency of the transcoded bitstream is low for both method 1 and method 3, then method 3 should be selected.

One way of indicating the transcoding method in the SI bitstream is to design a specific syntax (including SEI message) to signal the method, e.g. as numerical values. Another way is to utilize existing video codec syntax, such as HEVC or H.264 bitstream syntax (including SEI message) for indicating the transcoding method. The use of existing syntax and standard decoder operations is useful.

An example of using an existing video codec syntax is to use an existing flag like the transform skip flag or coded bit flag (cbf) in the SI bitstream (i.e. the second bitstream) to indicate that the residual for a block needs to be re-generated. In the case of the transform skip flag it can instead of declaring if transform is used or not used can be re-interpreted to indicate that the residual needs to be re-generated or not using the transform. In this case the transcoded bitstream may have the transform skip flag set to 0 to indicate that the residual needs to be re-generated by transform if there exist a residual (cbf equal to 1) or set to 1 to indicate that the residual not needs to be re-generated if there exist a residual (cbf equal to 1). It should be noted that it is also possible to do the other way around, i.e. that the transcoded bitstream have the transform skip flag set to 1 to indicate that the residual needs to be re-generated by transform if there exist a residual (cbf equal to 1) or set to 0 to indicate that the residual not needs to be re-generated if there exist a residual (cbf equal to 1) In the case of the coded bit flag, if the coded bit flag indicates that no residual is present in the bitstream, the transcoder needs to evaluate the block to see whether it truly should have no residual or whether a residual should be inserted. Another example is that a certain pattern of coded transform coefficients in the SI bitstream, i.e. the second bitstream, is regarded as a "dummy" residual that shall e.g. be replaced by a re-generation of the residual in a transcoded bitstream. An example of a certain coded transform coefficient pattern is to let a residual with all zeros except having one coefficient equal to 1 to indicate that the residual should be replaced. Which position to use needs to be agreed on in the system deploying this technology. One example position is the position corresponding to the DC coefficient. Another example is to base the indication on the sum of absolute coefficients values modulo 2 and let an odd sum correspond to "dummy" residual or an even sum correspond to a "dummy" residual. When one or several of these "dummy" patterns are used, the encoder needs to avoid using the "dummy" pattern for any block where coefficients should be explicitly transmitted, i.e. when the result of the quantization operation of the encoder is by chance identical to the "dummy" pattern, it needs to choose a different pattern, or accept that the transcoder will re-generate the coefficients for that block. Choosing a different pattern than obtained as output from the quantization may be slightly disadvantageous in terms of rate-distortion performance for the block.

Another way of determining the "dummy" coded transform coefficient pattern is to first encode a picture or slice, generating all transform coefficients in a "conventional" way (i.e. without using "dummy" patterns), then analyzing which coefficient patterns have been used, and then selecting a "dummy" coefficient pattern such that the rate-distortion performance for that picture or slice is maximized. The selected "dummy" coefficient pattern should then be indicated to the transcoder, e.g. by means of an SEI message sent together with the coded slice or picture of the SI bitstream.

Another example is to include blocks which should be fully transcoded. This could be done for areas where it is relatively simple to find a good encoding. The transcoding information in this case could for example be signaled by setting a skip flag for a 64×64 block of pixels in the bitstream. This would normally mean that the block should use a default prediction mode and no transform coefficients, but would instead be re-interpreted as meaning that the transcoder should determine suitable block sizes, prediction modes and transform coefficients within the 64×64 block. Alternatively this is used together with another coding parameter for example that SAO is used for a certain block size like 64×64. In that case the transcoding information consist of both that SAO is indicated to be used for the 64×64 block and the block has the skip flag set, then the transcoder determine suitable block sizes, prediction modes and transform coefficients within the 64×64 block otherwise the 64×64 block is truly skipped.

Transcoding is accomplished by decoding the first bitstream, possibly re-sampling it to the target resolution after transcoding, and decoding the SI bitstream (i.e. the second bitstream), interpreting the transcoding information received in the SI bitstream to apply the transcoding method indicated in the transcoding information accordingly.

One example would be that one of two different transcoding methods can be indicated for a prediction unit which are receiving only the motion vector (method 1), and (method 2) receiving both the motion vector and the residual data. Using existing video codec syntax according to one embodiment, method 1 could be indicated by using a "dummy" transform coefficient pattern. In case the "dummy" transform coefficient pattern is detected at the transcoder, the transcoder uses the decoded (and possibly re-sampled) samples from the first bitstream to derive a new residual as the difference between the decoded (and possibly re-sampled) samples from the first bitstream and a prediction signal generated by applying the motion vector on previously transcoded pictures, and then transforming the residual signal into transform coefficients, and then writing (e.g. entropy encoding) the coefficients into the transcoded bitstream. Otherwise, if the "dummy" pattern is not detected, the transform coefficients received in the SI bitstream would just be copied into the transcoded bitstream according to method 2.

Instead of configuring the origin encoder to provide the transcoding information, a video processing node also referred to as coefficient extractor is configured to provide such transcoding information.

An embodiment with the coefficient extractor is exemplified below and in FIG. 5. A standard encoder 502 (e.g. an open source or any other encoder that is known for the transcoder) is used to create a video sequence encoded in the second format 506. The conversion of the video sequence which may consist of compressed (encoded) samples or uncompressed samples (original samples in YUV/RGB or any other source format but may originate from an earlier decompression from yet another format) or both from the first format 505 to uncompressed samples in the second format 506 may be performed by a pre-processor 501. In case both compressed samples and uncompressed samples in the first format are available to the pre-processor it can produce a sequence of uncompressed samples where some pictures are based on uncompressed samples from the first format and some pictures are based on compressed samples from the first format. This information could also be given to the coefficient extractor so it doesn't remove coefficients that not the transcoder can generate.

The encoded (e.g. encoded according to HEVC) video sequence in the second format 506' is fed into a coefficient extractor 503 and the coefficient extractor 503 inserts the transcoding information in the second bitstream 507, e.g. by, possibly selectively, replacing the conventional transform coefficients by "dummy" coefficient patterns to indicate that the transcoder needs to re-generate the coefficients. If the transcoding method is to be indicated selectively e.g. on a per-block basis, the coefficient extractor needs to receive information about desired transcoding method, e.g. from the origin encoder, or by another entity that decides the transcoding methods. When the coefficient extractor knows that the origin encoder has produced coefficients based on an already compressed video that also is available at the transcoder the coefficient extractor can insert transcoding information indicating method 1 (dummy coefficients, i.e. guided transcoding) instead of transcoding information indicating method 2 (actual coefficients, i.e. simulcast). If the coefficient extractor knows that the origin encoder has produced a block or picture that also a transcoder can derive the coefficient extractor can insert transcoding information indicating method 3 (full transcoding). If the actual coefficients correspond to a dummy coefficients the coefficients will remain but will be interpreted as method 1 by the transcoder since the transcoder can re-generate the coefficients exactly and there will still be a match between origin encoder and the transcoder. When the origin encoder has produced coefficients based on both compressed video and original video the coefficient extractor needs to receive information about that so it does not remove coefficients that the transcoder not can re-generate (e.g. not use method 1).

Instead of receiving information about that, the coefficient extractor can determine that by re-generating coefficients (method 1) or at least one block (method 3) like the transcoder and if it cannot produce same coefficients or same block it needs to keep them. To be able to regenerate coefficients or at least one block the coefficient extractor needs to have the reconstructed samples from the first format (possibly downsample them to the resolution of the second format) or a bitstream in the first format (then decode and subsample if needed).

In case the origin encoder has produced coefficients that can not be re-generated by the transcoder and have the same pattern as a "dummy" coefficients there will be a mismatch between the origin encoder and the transcoder unless all coefficients for that slice or picture are kept (method 2).

Hence the transcoder 504 receives the first bitstream representing the video sequence with the first format 505 and the second bitstream with the transcoding information and transcodes the bitstream from the first format to the second format 508.

If the transcoder has capability to work in different ways for different pictures or blocks it needs to know what it should do if it receives a second bitstream. The coefficient extractor needs thus to make sure that this works. Some pictures of the video could be regenerated by full transcoding and for some pictures the transcoder doesn't need to regenerate any information.

When full transcoding is to be deployed the full duration of a sequence of the second bitstream is not needed. The coefficient extractor can then remove the second bitstream completely. If some pictures can benefit from full transcoding those pictures need to be indicated so that the transcoder can handle them properly. Similarly if a picture is simulcast the coefficient extractor makes sure that the transcoder will understand this etc.

In a particular case, the coefficient extractor would replace all transform coefficient patterns for a coded slice or picture by a dummy coefficient pattern or flags indicating no coefficients are present. In that way, a SI encoder for a simple guided transcoding deployment could be realized by cascading an existing standard encoder and the coefficient extractor.

As illustrated in FIG. 6 a method for a video encoder is provided. The method comprises providing 601 to a transcoder a first bitstream representing a video sequence with a first format, the encoder then creates 602 a second bitstream representing transcoding information indicative of a transcoding method that should be used by the transcoder for transcoding the video sequence from the first format to a second format and the encoder provides 603 to the transcoder the second bitstream.

As illustrated in FIG. 7 a method for a video transcoder is provided. The method comprises receiving 701 from an encoder a first bitstream representing a video sequence with a first format. The video transcoder further receives 702 a second bitstream representing transcoding information indicative of a transcoding method that should be used by the transcoder for transcoding the video sequence from the first format to a second format, and transcodes 703 the first bitstream from the first format to the second format using the indicated transcoding method.

Figure 8:
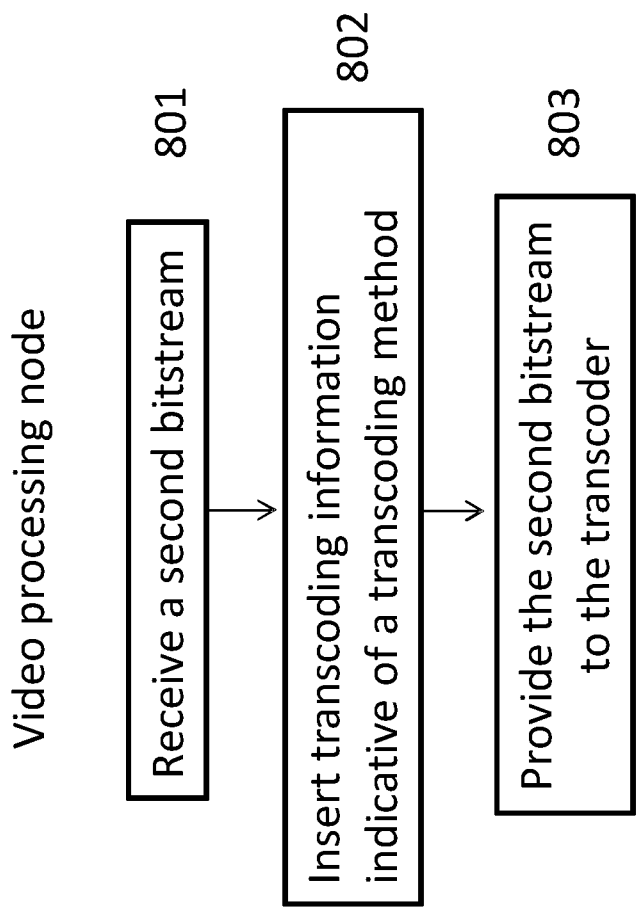

As illustrated in FIG. 8, a method for a video processing node is provided. The method comprises receiving 801 from an encoder a second bitstream representing a video sequence with a second format, and inserting 802, in the second bitstream, transcoding information indicative of a transcoding method that should be used by a transcoder for transcoding a video sequence from a first format to the second format. The video processing node transmits 803, to a transcoder, the second bitstream comprising the inserted transcoding information indicative of a transcoding method that should be used by the transcoder for transcoding a video sequence from a first format to the second format.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs). Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 9:
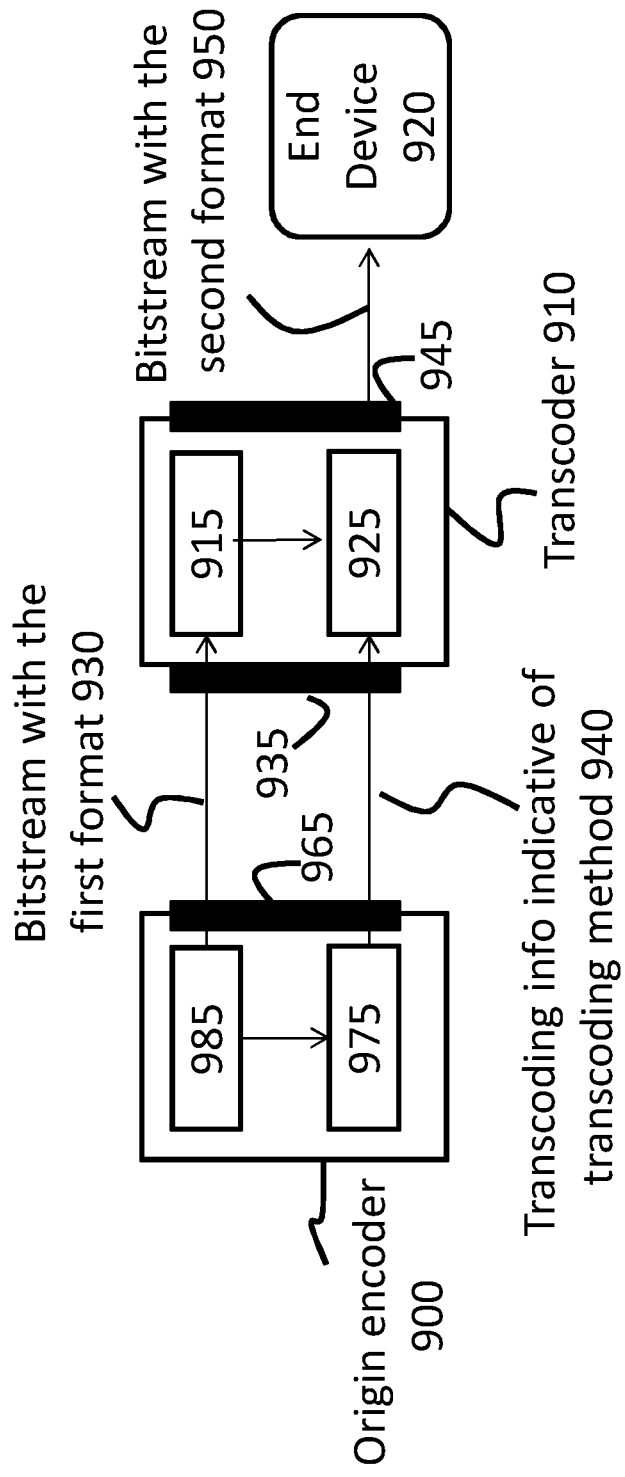
FIG. 9 illustrates schematically an encoder and a transcoder according to an embodiment of the present invention.

FIG. 9 illustrates a particular implementation.

The video encoder 900 is configured to provide to a transcoder 910 a first bitstream 930 representing a video sequence with a first format, the encoder 900 is further configured to create a second bitstream 940 representing transcoding information indicative of a transcoding method that should be used by the transcoder for transcoding the video sequence from the first format to a second format, and the encoder is further configured to provide to the transcoder the second bitstream 940.

As further illustrated in FIG. 9, a video transcoder 910 is configured to receive from the encoder 900 the first bitstream 930 representing the video sequence with the first format and configured to receive the second bitstream 940 representing transcoding information indicative of a transcoding method that should be used by the transcoder for transcoding the video sequence from the first format to a second format and configured to transcode the first bitstream from the first format to the second format 950 using the indicated transcoding method.

Figure 5:
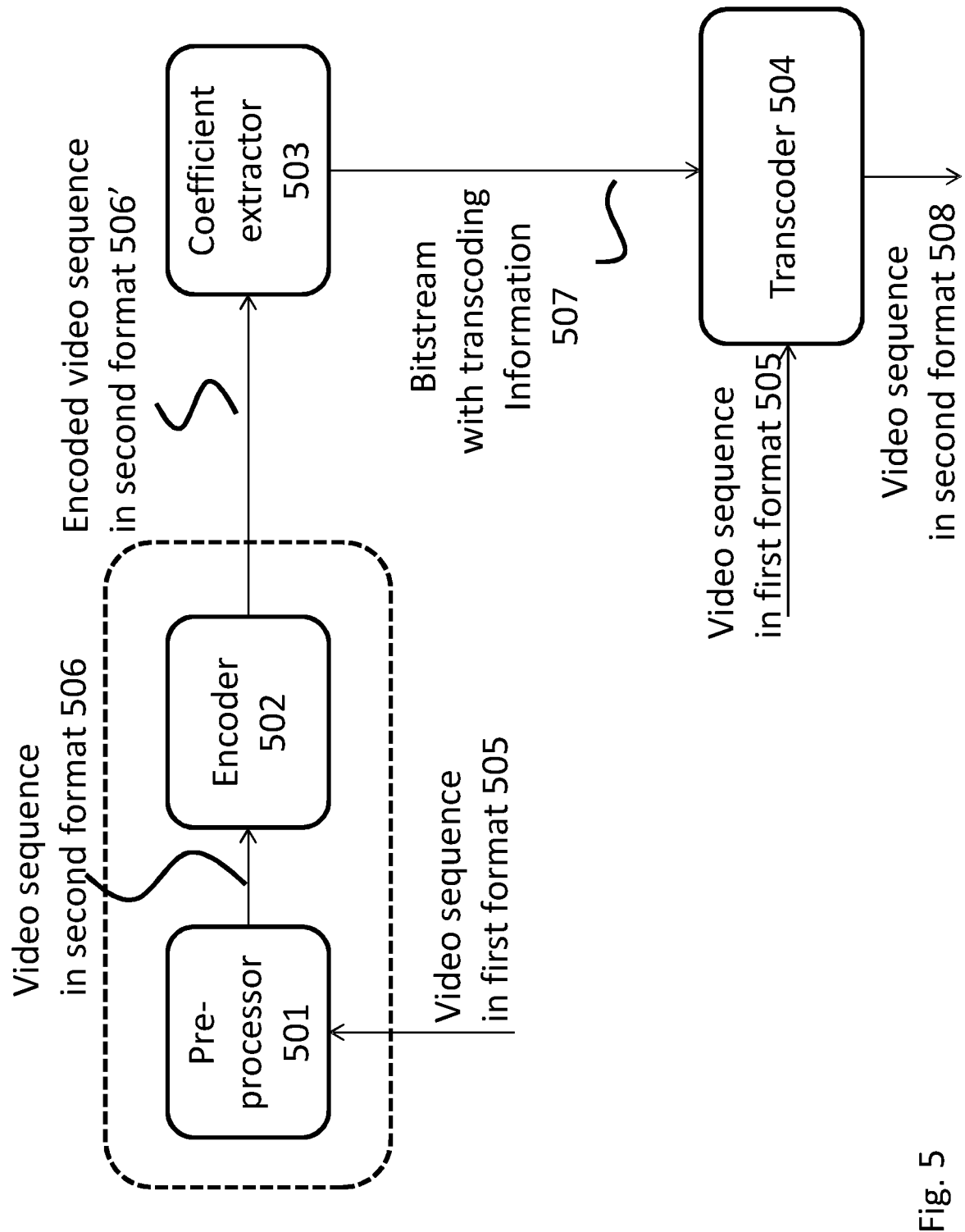
FIG. 5 illustrates schematically an embodiment with the video processing node also referred to as coefficient extractor.

A video processing node is also provided as illustrated in FIG. 5, The video processing node is configured to receive from an encoder a second bitstream representing a video sequence with a second format. The video processing node is configured to insert, in the second bitstream, transcoding information indicative of a transcoding method that should be used by a transcoder for transcoding a video sequence from a first format to the second format, and configured to transmit the second bitstream comprising the inserted transcoding information indicative of a transcoding method that should be used by a transcoder for transcoding a video sequence from a first format to the second format.

According to one embodiment, the transcoding information comprises at least one syntax element at least indicative of if a residual needs to be regenerated at the transcoder (transcoding is needed) or if the residual is received from the encoder (as for the simulcast), wherein the residual is originating from a difference between the video sequence of the second format and a prediction of the video sequence of the second format generated according to transcoding information.

The at least one syntax element may be a transform skip flag and the transform skip flag equal 0 may indicate that the residual is received from the encoder and transform skip flag equal to 1 may indicate that the residual is not provided from the encoder.

According to a further embodiment, the transcoding information may comprise one of plurality of patterns of coded transform coefficients, one specific pattern may be indicative of that a residual needs to be regenerated at the transcoder and the remaining patterns may be indicative of that the residual is received from the encoder, wherein the residual may originate from a difference between the video sequence of the second format and a prediction of the video sequence of the second format generated according to transcoding information.

The difference between the video sequence of the second format and a prediction of the video sequence of the second format generated according to transcoding information may be transform coded.

Further, the transcoding information may comprise at least a syntax element to indicate that the transcoder needs to perform full transcoding. The syntax element may be a skip flag that is re-interpreted to indicate that the transcoder needs to perform full transcoding.

Also, the transcoding information may comprise the bitstream with the second format indicative of simulcast.

The first format may be a high quality compression format and the second format may be a low quality compression format. The transcoding information may be valid per group of pictures, per picture, per slice or per block.

Hence FIG. 9 illustrates a particular hardware implementation of an encoder 900 according to an embodiment.

The video encoder 900 comprises a transmitter 965 for providing to a transcoder 910 a first bitstream 930 representing a video sequence with a first format, a bitstream creator 975 for creating a second bitstream representing transcoding information indicative of a transcoding method that should be used by the transcoder for transcoding the video sequence from the first format to a second format, and the transmitter 965 is further configured to provide to the transcoder the second bitstream. An encoding module 985 is configured to encode the bitstream with the first format.

The video transcoder 910 comprises a receiver 935 for receiving from an encoder 900 a first bitstream 930 representing a video sequence with a first format and for receiving a second bitstream 940 representing transcoding information indicative of a transcoding method that should be used by the transcoder for transcoding the video sequence from the first format to a second format. The transcoder comprises a decoding module 915 for decoding the first bitstream and a transcoding module 925 for decoding the second bitstream and for encoding the first bitstream to the second format by using decoded transcoding information from the second bitstream. The first bitstream with the second format 950 is then sent by a transmitter 945 to an end device 920, wherein the second format may be required for the end device 920.

Figure 10:
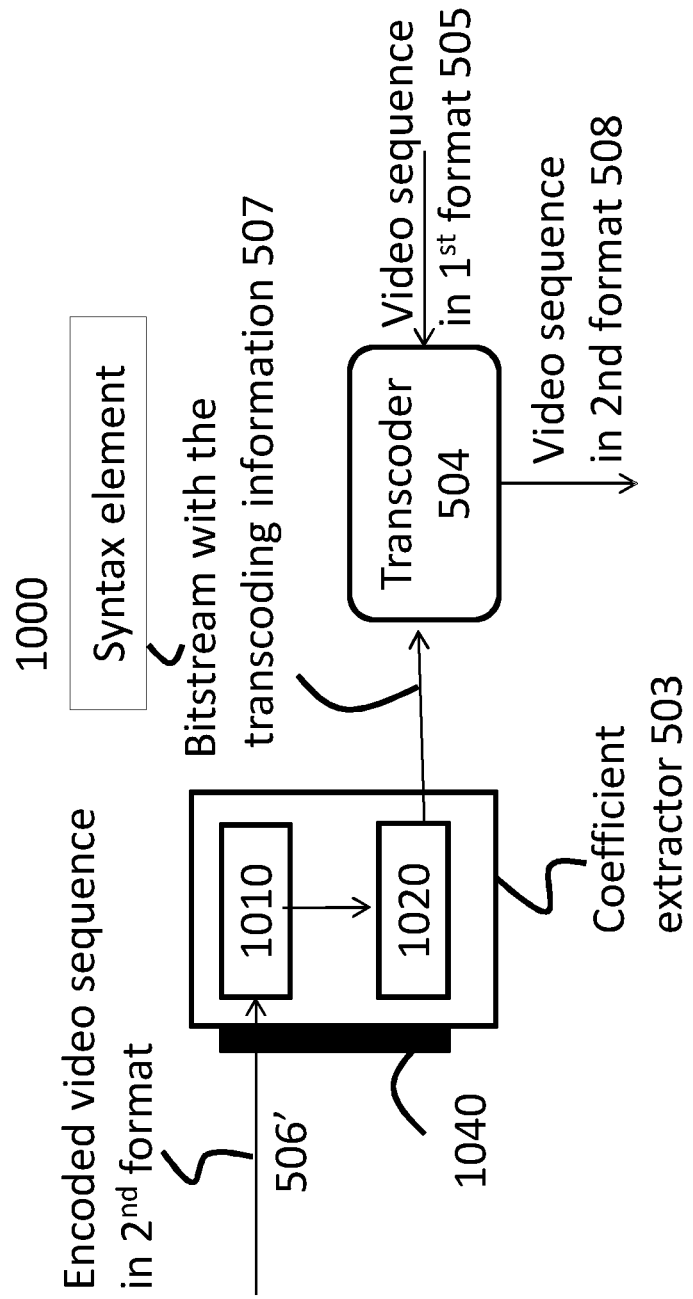
FIG. 10 illustrates schematically an embodiment with the video processing node also referred to as a coefficient extractor.

A video processing node 503 comprises a receiver 1040 as illustrated in FIG. 10 for receiving from an encoder a second bitstream 506' representing a video sequence with a second format, an inserter 1010 for inserting, in the second bitstream, transcoding information 1000 indicative of a transcoding method that should be used by the transcoder 504 for transcoding a video sequence from a first format to the second format. The video processing node further comprises a transmitter 1020 for transmitting the second bitstream comprising the inserted transcoding information 1000 (such as a syntax element) indicative of a transcoding method that should be used by the transcoder for transcoding the video sequence from a first format to the second format.

Alternatively, at least some of the steps, functions, procedures, modules and/or blocks described herein may be implemented in software such as a computer program for execution by suitable processing circuitry such as one or more processors or processing units.

Figure 11:
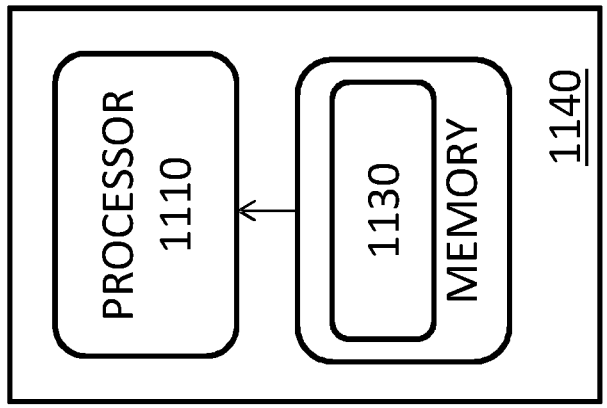

Accordingly as illustrated in FIG. 11, a computer program is provided. The computer program 1140 comprises instructions 1130, e.g. stored in a memory, which when executed by a processor 1110, cause said processor 1110 to provide to a transcoder a first bitstream representing a video sequence with a first format, to create a second bitstream representing transcoding information indicative of a transcoding method that should be used by the transcoder for transcoding the video sequence from the first format to a second format, to provide to the transcoder the second bitstream.

Figure 12:
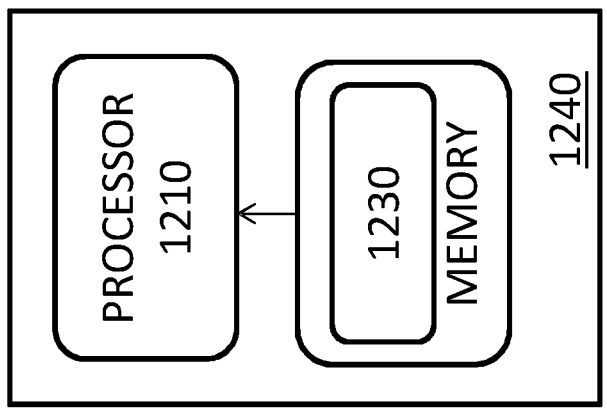

As illustrated in FIG. 12, a further computer program is provided. The computer program 1240 comprises instructions 1230, e.g. stored in a memory, which when executed by a processor 1210, cause said processor 1210 to receive from an encoder a first bitstream representing a video sequence with a first format and to receive a second bitstream representing transcoding information indicative of a transcoding method that should be used by the transcoder for transcoding the video sequence from the first format to a second format.

Figure 13:
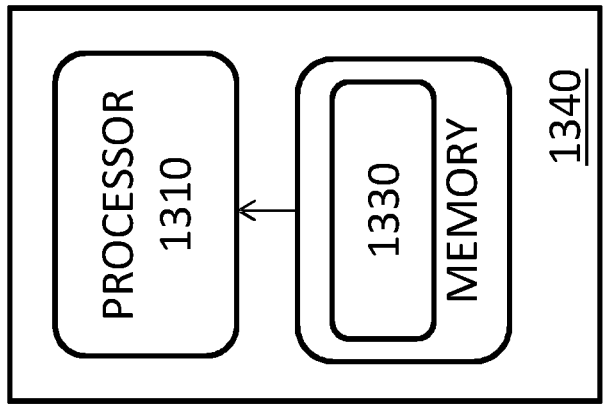
FIG. 11-14 illustrates different aspects of embodiments of the present invention.

A yet further computer program 1340 is provided as illustrated in FIG. 13. The computer program comprises instructions 1330, e.g. stored in a memory, which when executed by a processor 1310, cause said processor 1310 to receive from an encoder a second bitstream representing a video sequence with a second format, to insert, in the second bitstream, transcoding information indicative of a transcoding method that should be used by a transcoder for transcoding a video sequence from a first format to the second format, and to transmit the second bitstream comprising the inserted transcoding information indicative of a transcoding method that should be used by the transcoder for transcoding the video sequence from the first format to the second format.

In a particular embodiment, the respective processor is operative, when executing the instructions stored in a memory to perform the above described operations. The processor is thereby interconnected to the memory to enable normal software execution.

In one example, at least some of the steps, functions, procedures, modules and/or blocks described herein are implemented in a computer program, which is loaded into the memory for execution by processing circuitry including one or more processors. The processor and memory are interconnected to each other to enable normal software execution. A communication circuitry is also interconnected to the processor and/or the memory to enable input and/or output of the respective bitstream.

The video encoder, video transcoder and video processing node can be any device or network node that can receive/transmit and process a video bitstream. For instance, such a device or network node could be a server or a computer, either stationary or portable, such as laptop, a smart phone, a tablet, a set-top box, etc.

The term 'processor' should be interpreted in a general sense as any system or device capable of executing program code or computer program instructions to perform a particular processing, determining or computing task.

Processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

Figure 14:
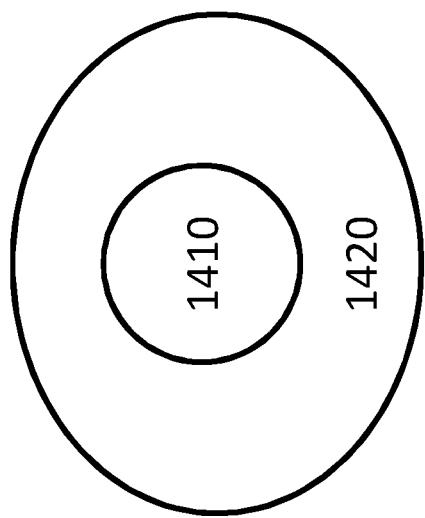

As illustrated in FIG. 14, the proposed technology also provides a carrier 1420 comprising the computer program 1410. The carrier 1420 is one of an electronic signal, an optical signal, an electromagnetic signal, a magnetic signal, an electric signal, a radio signal, a microwave signal, or a computer-readable storage medium.

By way of example, the software or computer program 1410 may be realized as a computer program product, which is normally carried or stored on a computer-readable medium, preferably non-volatile computer-readable storage medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device.

The computer program may thus be loaded into the operating memory of a computer or equivalent processing device.

The flow diagram or diagrams presented herein may therefore be regarded as a computer flow diagram or diagrams, when performed by one or more processors.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A video encoder, the video encoder configured to:
provide to a transcoder a first bitstream representing a video sequence with a first format;
create a second bitstream comprising transcoding information indicative of a transcoding method that should be used by the transcoder for transcoding the video sequence from the first format to a second format; and
provide the second bitstream to the transcoder, wherein
the transcoding information comprises at least one syntax element indicating whether or not a residual is provided from the encoder, and
the residual is originating from a difference between the video sequence of the second format and a prediction of the video sequence of the second format generated according to transcoding information.

2. The video encoder according to claim 1, wherein the at least one syntax element is a transform skip flag.

3. The video encoder according to claim 2, wherein the transform skip flag equal to 0 indicates that the residual is provided from the encoder and transform skip flag equal to 1 indicates that the residual is not provided from the encoder.

4. The video encoder according to claim 3, wherein
the transcoding information comprises one of a plurality of patterns of coded transform coefficients,
one specific pattern is indicative of that the residual is not provided from the encoder and the remaining patterns are indicative of that the residual is provided from the encoder, and
the residual is originating from a difference between the video sequence of the second format and a prediction of the video sequence of the second format generated according to transcoding information.

5. The video encoder according to claim 1, wherein the difference between the video sequence of the second format and a prediction of the video sequence of the second format generated according to transcoding information is transform coded.

6. The video encoder according to claim 5, wherein the transcoding information comprises at least a syntax element to indicate that the transcoder needs to perform full transcoding.

7. The video encoder according to claim 1, wherein the first format is a high quality compression format and the second format is a low quality compression format.

8. A video transcoder, the video transcoder configured to:
receive from an encoder a first bitstream representing a video sequence with a first format;
receive a second bitstream comprising transcoding information indicative of a transcoding method that should be used by the transcoder for transcoding the video sequence from the first format to a second format; and
transcode the first bitstream from the first format to the second format using the indicated transcoding method, wherein
the transcoding information comprises at least one syntax element indicating whether or not a residual is received from the encoder, and
the residual is originating from a difference between the video sequence of the second format and a prediction of the video sequence of the second format generated according to transcoding information.

9. The video transcoder according to claim 8, wherein the at least one syntax element is a transform skip flag.

10. The video transcoder according to claim 9, wherein the transform skip flag equal to 0 indicates that the residual is received from the encoder and transform skip flag equal to 1 indicates that the residual is not provided from the encoder.

11. The video transcoder according to claim 10, wherein the transcoding information comprises one of a plurality of patterns of coded transform coefficients,
one specific pattern is indicative of that the residual is not received from the encoder and the remaining patterns are indicative of that the residual is received from the encoder, and
the residual is originating from a difference between the video sequence of the second format and a prediction of the video sequence of the second format generated according to transcoding information.

12. The video transcoder according to claim 8, wherein the difference between the video sequence of the second format and a prediction of the video sequence of the second format generated according to transcoding information is transform coded.

13. The video transcoder according to claim 12, wherein the transcoding information comprises at least a syntax element to indicate that the transcoder needs to perform full transcoding.

14. The video transcoder according to claim 8, wherein the first format is a high quality compression format and the second format is a low quality compression format.

15. A video processing node, the video processing node configured to:
receive from an encoder a second bitstream representing a video sequence with a second format;
insert, in the second bitstream, transcoding information indicative of a transcoding method that should be used by a transcoder for transcoding a video sequence from a first format to the second format; and
transmit the second bitstream comprising the inserted transcoding information indicative of a transcoding method that should be used by the transcoder for transcoding the video sequence from the first format to the second format, wherein
the transcoding information comprises at least one syntax element indicating whether or not a residual is received from the encoder, and
the residual is originating from a difference between the video sequence of the second format and a prediction of the video sequence of the second format generated according to transcoding information.

16. The video processing node according to claim 15, wherein the at least one syntax element is a transform skip flag.

17. The video processing node according to claim 16, wherein the transform skip flag equal to 0 indicates that the residual is received from the encoder and transform skip flag equal to 1 indicates that the residual is not provided from the encoder.

18. The video processing node according to claim 17, wherein
the transcoding information comprises one of a plurality of patterns of coded transform coefficients,
one specific pattern is indicative of that the residual is not received from the encoder and the remaining patterns are indicative of that the residual is received from the encoder, and
the residual is originating from a difference between the video sequence of the second format and a prediction of the video sequence of the second format generated according to transcoding information.

19. The video processing node according to claim 15, wherein the difference between the video sequence of the second format and a prediction of the video sequence of the second format generated according to transcoding information is transform coded.

20. The video processing node according to claim 19, wherein the transcoding information comprises at least a syntax element being a skip flag that is re-interpreted to indicate that the transcoder needs to perform full transcoding.

21. The video processing node according to claim 15, wherein the first format is a high quality compression format and the second format is a low quality compression format.

* * * * *